United States Patent [19]

Moy

[11] Patent Number: 4,844,247

[45] Date of Patent: Jul. 4, 1989

[54] DOCUMENT CARRIER

[76] Inventor: Ging J. Moy, 47 Suburban Rd., Clark, N.J. 07066

[21] Appl. No.: 232,149

[22] Filed: Aug. 15, 1988

[51] Int. Cl.⁴ .......................................... B65D 85/671
[52] U.S. Cl. .................................. 206/232; 206/303; 206/389; 206/397
[58] Field of Search ............... 206/226, 232, 303, 307, 206/309, 310, 387, 389, 397, 403, 404–407

[56] References Cited

U.S. PATENT DOCUMENTS

| | | | |
|---|---|---|---|
| 3,389,872 | 6/1968 | Lyman | 206/389 |
| 3,441,127 | 4/1969 | Mann | 206/232 |
| 3,770,118 | 11/1973 | Jones | 206/232 |
| 3,921,798 | 11/1975 | Dean et al. | 206/459 |
| 4,022,322 | 5/1977 | Louzil | 206/387 |
| 4,290,524 | 9/1981 | Azar | 206/232 |
| 4,365,708 | 12/1982 | Tyus | 206/232 |
| 4,433,780 | 2/1984 | Ellis | 206/232 |
| 4,445,612 | 5/1984 | Shepherd | 206/232 |
| 4,457,428 | 7/1984 | Saito | 206/232 |
| 4,702,373 | 10/1987 | Meade | 206/389 |
| 4,752,003 | 6/1988 | Miller et al. | 206/232 |

*Primary Examiner*—Jimmy G. Foster
*Attorney, Agent, or Firm*—David M. Rosenblum

[57] ABSTRACT

The present invention provides a document carrier to attach sheets of documents to a reel of magnetic tape. The document carrier includes a container to contain the sheets having a length greater than the diameter of the tape hub of the tape reel and a chuck. The container is attached to the underside of a housing of the chuck that is configured to extend into the tape reel with the container bearing against one of the surfaces of the tape reel. The housing is configured to bear against the inner surface of the tape hub to prevent lateral movement of the tape reel. Manually releasable engagement means, connected to the housing, releasably engage the other of the surfaces of the tape reel adjacent to the tape hub so that the tape reel is held between the engagement means and the container. When the releasable engagement means are disengaged, the housing may be removed to respectively remove the container from the tape reel.

11 Claims, 4 Drawing Sheets

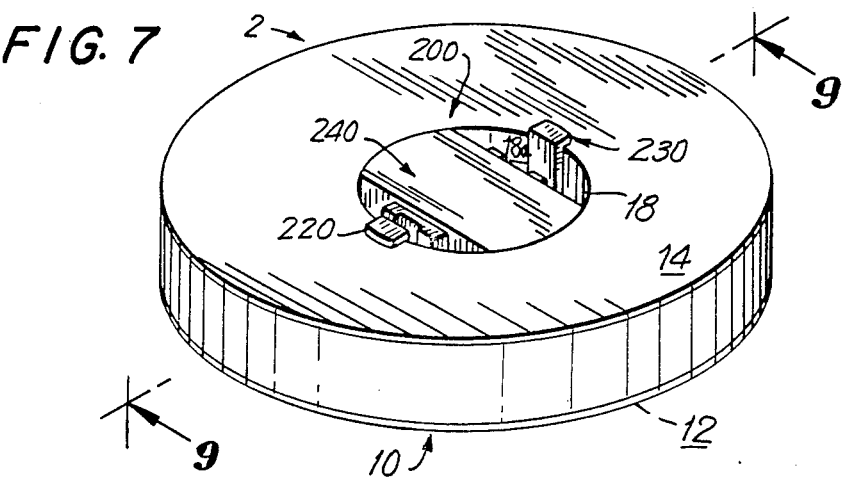
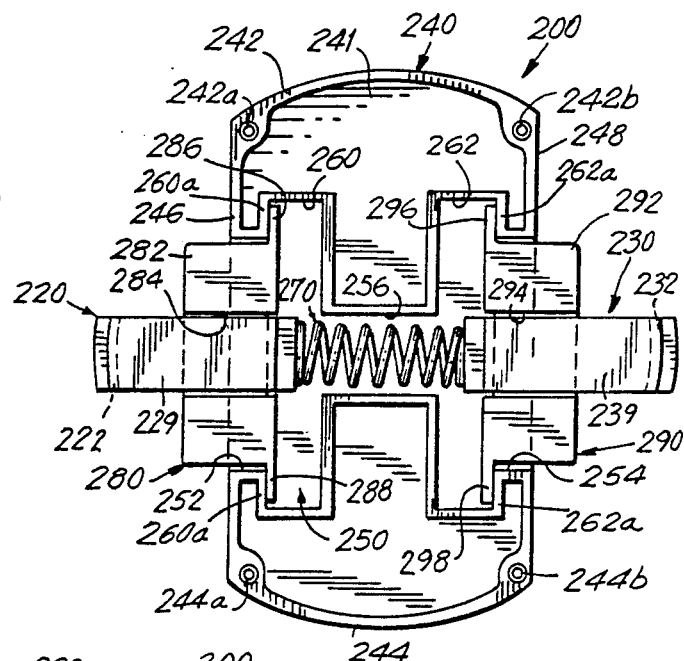
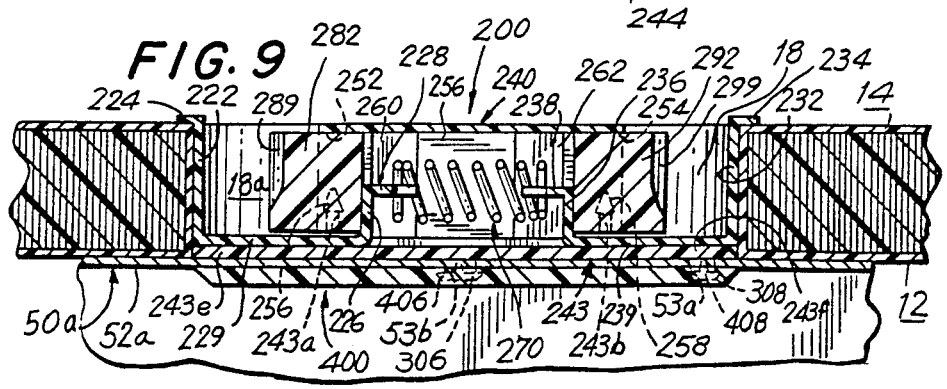

DOCUMENT CARRIER

FIELD OF THE INVENTION

The present invention relates to a document carrier for attaching documents to a reel of magnetic tape.

BACKGROUND OF THE INVENTION

Reels of magnetic tape, among other applications, are commonly used to store computer programs and data. Typically, a large number of tape reels are stored in a rack with numbers or other identifying data imprinted on labels attached to the reels. The identifying numbers etc. are used to locate the particular tape reel of interest. Very often the contents of the tape reel can be hundreds, if not thousands, of lines of coded instructions or formatted data. Typically, these instructions and/or data are printed out on sheets of computer paper, which by necessity are retained by the programmer or his or her staff as a separate document that is not physically attached to the tape reel. Very often, when the tape reel is transferred to another programmer, the pages of documentation are attached to the reel by rubberbands and the like and can be easily lost or misplaced.

The prior art has provided devices that are attached to the reel of magnetic tape in order to provide greater documentation for the contents of the tape or to attach the documents to the reel of tape itself. For instance, Dean et al, U.S. Pat. No. 3,921,798, provides a labelholder that lies flat against the outer peripheral surface of a split-ring tape reel cover. Mead, U.S. Pat. No. 4,702,373, provides a pair of telescopically interconnecting parts that extend into the hub of the magnetic tape reel. The interconnecting parts are hollow and form a compartment within the hub of the tape reel to store sheets of paper containing data stored on the reel of tape. The present invention is not however, limited to the storage of documentation for magnetic tapes that are utilized in electronic digital computers. The present invention could also have application to magnetic tapes that store analogue information, for instance, musical recordings. In this regard, Louzil, U.S. Pat. No. 4,022,322, should also be mentioned. This patent provides a container that includes a receptacle for the storage of a tape cassette. The receptacle has a clamping device disposed on a wall of the container to attach the container to the tape cassette for storing a note or other documentation relating to the tape cassette.

None of the patents, discussed above, provide an apparatus that is capable of attaching large amounts of documentation to the reel of tape. For instance, Dean et al is simply a label holder for the tape. Although, Louzil provides somewhat more space for the documents that are to be attached to the tape, the small slot provided in the external wall of the tape receptacle does not comprehend the storage of a large number of pages of documentation. Similarly, although Mead provides even a greater space than that of the Dean et al and Louzil patents, the storage space is necessarily limited by the available space within the hub of the tape reel.

The present invention provides a device in which any number of pages, for instance, computer output pages containing the coded instructions or lines of data recorded on the tape can be attached to the tape reel. As will be discussed in more detail, hereinafter, this is accomplished by providing a container that is externally carried on the tape. The container can be of any size. The container itself is attached to a chuck that is inserted within the tape hub and that releasably engages one of the surfaces of the tape reel at locations, adjacent to the tape hub so that the tape reel is releasably held between the engaged surfaces of the tape reel and the container.

SUMMARY OF THE INVENTION

The present invention provides a document carrier for attaching documents to a reel of magnetic tape having a tape hub for attaching the tape reel to the sprocket of a tape drive. The document carrier includes a container and a chuck.

The container contains the documents and has a length that is greater than the diameter of the tape hub. The chuck includes a housing, attachment means for attaching the container to the underside of the housing, and manually releasable engagement means. The housing is configured to extend through the tape hub and engage the inner surface of the tape hub to prevent lateral movement of the tape reel. The attachment means attach the container so that the container is operable to bear against one of the outer surfaces of the tape reel when the housing is extended through the tape hub. The manually releasable engagement means are connected to the housing and are spaced from the underside of the housing for releasably engaging the other of the outer surfaces of the tape reel at opposed locations adjacent to the tape hub such that the tape reel is operable to be held between the engagement means and the container until the engagement means are manually released. After the release of the engagement means, the housing may be removed from the tape hub and the container may be separated from the tape reel.

DESCRIPTION OF THE DRAWINGS

In the accompanying drawings:

FIG. 7 is a perspective view of an alternative embodiment of a document carrier of the present invention attached to a tape reel.

FIG. 8 is a bottom plan view of a chuck of an alternative embodiment of a document carrier of the present invention illustrated in FIG. 7.

FIG. 9 is an enlarged fragmentary cross-sectional view taken along lines 9—9 of FIG. 7.

DESCRIPTION OF THE PREFERRED EMBODIMENT

Figure 1:
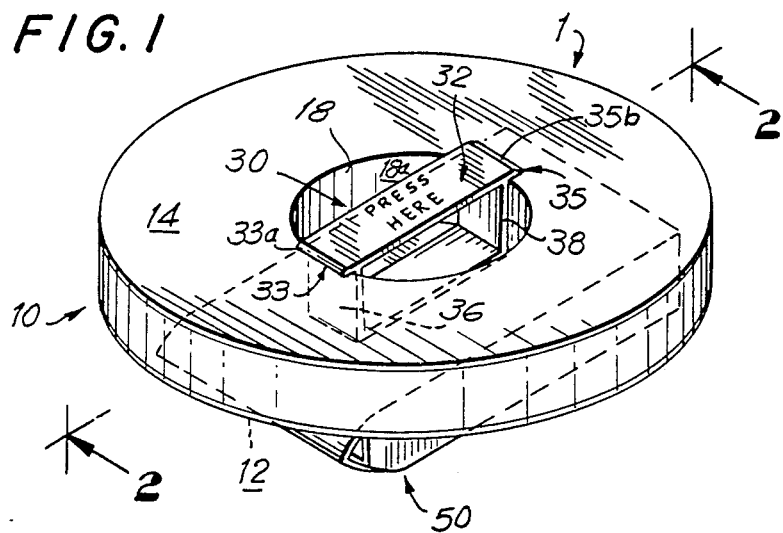
FIG. 1 is a perspective view of a preferred embodiment of a document carrier of the present invention attached to a tape reel.
Figure 4:
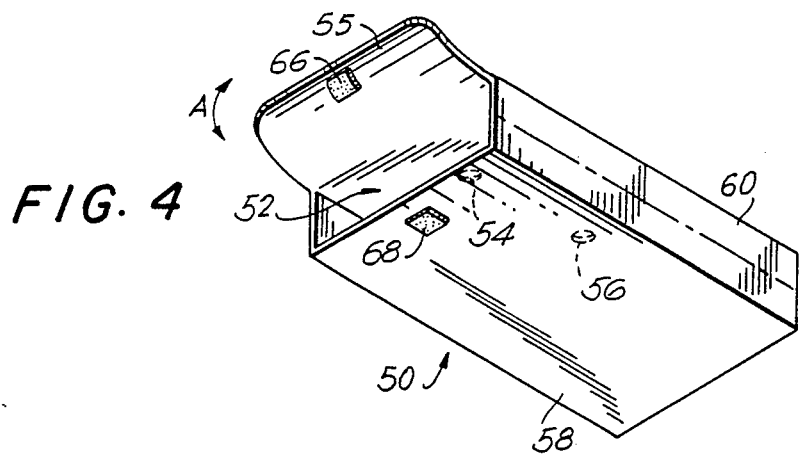
FIG. 4 is a perspective view of a preferred container of the present invention.

With reference to FIGS. 1 and 7, a pair of alternative embodiments of the document carrier of the present invention are illustrated. The document carrier 1, illustrated in FIG. 1, is preferably used for relatively light document carrying applications and the document carrier 2, illustrated in FIG. 7, is designed for relatively heavy document carrying applications. In both of the embodiments, a container, such as illustrated by a container 50 in FIG. 4, is attached to the underside of a housing of a chuck, either chuck 30 or 200. The housing of either of the chucks engages the inside surface 18a of the tape hub 18 of a tape reel 10 to prevent lateral movement of the tape reel 10. The chucks also have manually releasable engagement means, connected to the housing and spaced from the underside of the housing. The tape reel 10 is held between the container and the engagement means which respectively engage the opposed outer surfaces 12 and 14 of the tape reel 10. As will be discussed in detail hereinafter, the engagement means can comprise either the ends 33 and 35 of a top engagement strip of the chuck 30 or the top engagement flanges 224 and 234 of a pair of flange-like members 220 and 230 of the chuck 200. After the engagement means are released, the housing and the container may be removed from the tape reel 10 to permit the tape reel 10 to be mounted on a tape drive.

Figure 2:
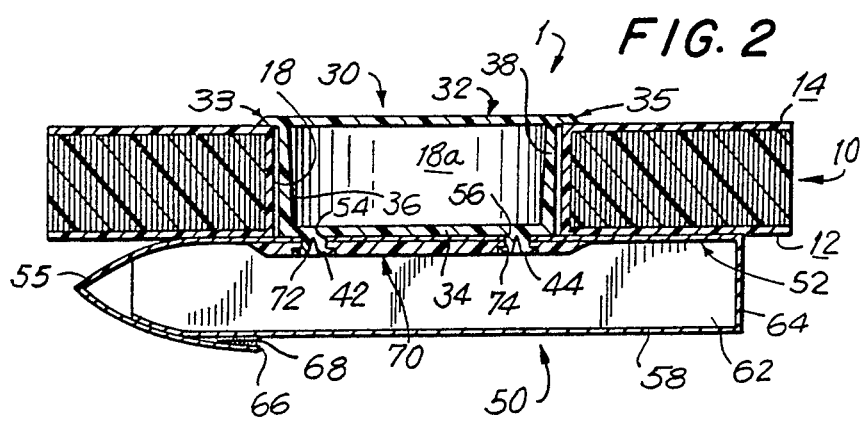
FIG. 2 is a cross-sectional view taken along lines 2—2 of FIG. 1.

The document carrier 1 employs a chuck 30 that is connected to a container 50. With reference to FIGS. 1 and 2, the chuck 30 is integrally formed in one piece, from a resilient plastic or nylon. The chuck comprises a housing that is formed by a top engagement strip 32, a base strip 34 and a pair of spaced lateral engagement strips 36 and 38. As illustrated, the top engagement strip is connected to the lateral engagement strips, at one end of each of the lateral engagement strips; and the base strip 34 is connected to the lateral engagement strips, at the other of the ends of each of the lateral engagement strips. The top engagement strip 32 has a length greater than the diameter of the tape hub such that its ends 33 and 35 are operable to bear against and, thus, engage the surface 14 of the tape reel 10, at opposite locations, adjacent the tape hub 18. The lateral engagement strips 36 and 38 are sized and configured to bear against and, therefore, engage the inner surface 18a of the tape hub 18 at opposite locations thereof to prevent lateral movement of the tape reel 10. As a result, outward movement of the tape reel, relative to the container 50, is prevented by the ends 33 and 35 of the strip 32 and lateral movement of the tape reel, relative to the container 50, is prevented by the strips 36 and 38.

Figure 3:
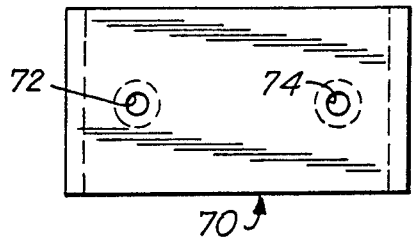
FIG. 3 is a top plan view of a stiffening plate that is inserted into a container of a document carrier of the present invention.

With reference to FIG. 4, the container 50 is provided with a basewall 52 having a pair of spaced openings 54 and 56. With reference to FIG. 3 a stiffening plate 70 is inserted within the container 50. The stiffening plate 70 has a pair of spaced apertures 72 and 74 that are spaced and configured to align with the openings 54 and 56 when the stiffening plate 70 is inserted into the container 50. The base strip 34 is provided with a pair of button-like projections 42 and 44 that are configured to be forced through the openings 54 and 56 and the apertures 72 and 74 to connect the stiffening plate, and hence, the basewall 52 to the base strip 34. As illustrated, the ends of the projections 42 and 44 are preferably slotted to allow the ends to inwardly deform when forced through the apertures and openings of the stiffening plate and the basewall. The container 50 has a length that is greater than the tape hub 18 so that the tape reel 10 is operable to be securely held between the ends 33 and 35 of the top engagement strip 32 and the basewall 52 of the container 50. In this regard, the length of the container should preferably be no more than the outer diameter of the tape reel 10 so that a tape cover, well known in the art, having a peripheral hook may be used to hang the tape reel 10 in a tape rack. Additionally the base strip 34 and the lateral engagement strips 36 and 38 are sized such that the base strip 34 is essentially level with the surface 12 of the tape reel 10 and within the tape hub 18. As can be appreciated, this is necessary to allow the container 50 to be operable to bear against the surface 12.

The container 50, which can be utilized with minor modifications with either the embodiments illustrated in FIGS. 1 or 7, is likewise preferably fabricated from a resilient plastic. In addition to the basewall 52 previously discussed, container 50 also includes a top wall 58 which is preferably clear so that, for instance, the programmer can see inside the container 50. A set of interconnected side and endwalls, 60, 62, and 64, connect top wall 58 to the basewall 52. The basewall 52 is preferably provided with an extending portion 54 that forms a coverflap that may be rotated to close and open in the direction of the double arrow head A. In this regard, strips of releasably connectable hook and fleece material 66 and 68 can be respectively provided on the end of extending portion 54 and on the top wall 58 to releasably attach the extending portion 54 to the top wall 58 and, thus, releasably seal the container 50.

Figure 5:
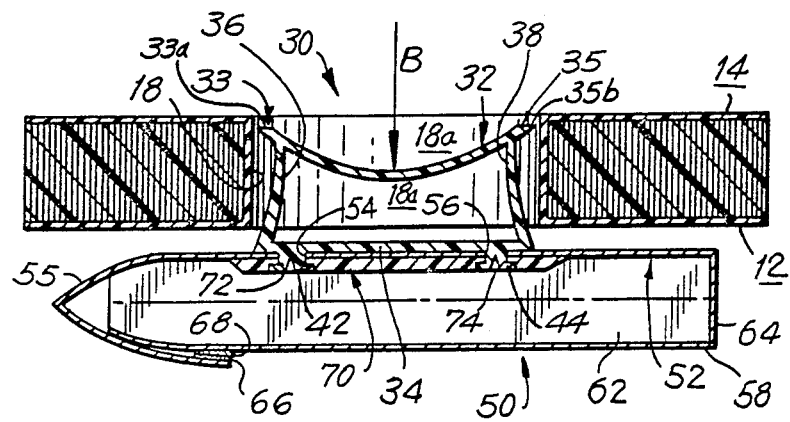
FIG. 5 is a cross-sectional view taken along lines 2—2 of FIG. 1 with the chuck of the document carrier of the present invention disengaged from the tape hub.
Figure 6:
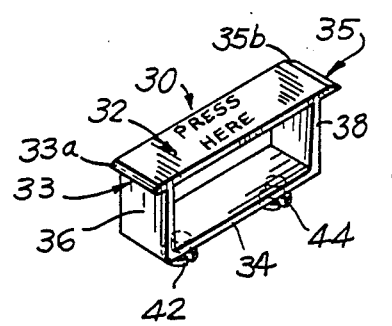
FIG. 6 is a perspective view of the chuck of the preferred embodiment of the documentation carrier of the present invention illustrated in FIG. 1.
Figure 10:
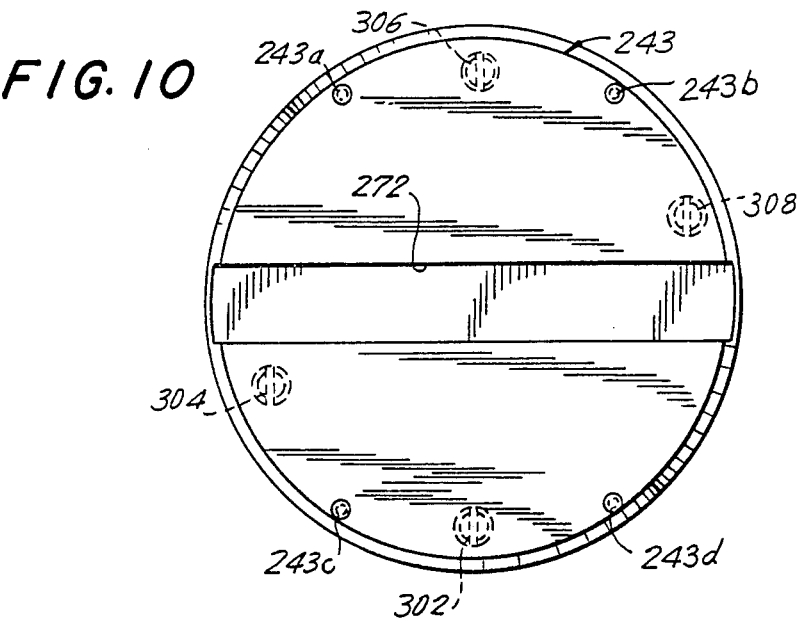
FIG. 10 is a top plan view of a basewall of the chuck of the alternative embodiment of the present invention illustrated in FIG. 7.

With reference to FIG. 5, the container 50 is detached from the tape reel 10 by disengaging the chuck 30. The chuck 30 is disengaged by manually exerting a force on the top engagement strip 32 in the direction of the arrowhead B. This force causes the ends 33 and 35 of the strip 32 to deform away from the surface 14 of the tape reel so that the entire housing of the chuck 30 may be pushed through the tape hub 18. In order to attach the container, the chuck 30 is simply pushed through the hub 18 with ends 33 and 35 deformed towards strips 36 and 38 until the ends 33 and 35 emerge from the tape hub and contact surface 14 of reel 10. In order to facilitate this, the ends 33 and 35 are preferably provided with a pair of sloping portions 33a and 35b.

As illustrated in FIG. 5, when the strip 32 is centrally depressed, the engagement strips 36 and 38 deform due to the flexible construction of the chuck 30. This deformation may occur to a greater or lesser extent, depending upon the flexibility of the strips 36 and 38. In fact, the strips 36 and 38 may be sized and fabricated to be rigid as compared with the strip 32, which in any possible embodiment of the chuck 30 must be flexible. Although not illustrated, a small stop piece could be provided on the base strip 34 so as to upwardly extend and prevent excessive deformation of the top strip 32 that might result in a permanent downward curvature of the strip 32 and a consequent loss of its flexibility.

With reference to FIGS. 7, 8, and 9, the alternative embodiment 2 of the documentation carrier of the present invention is illustrated as being, again, attached to tape reel 10. The tape carrier 2 employs a heavy duty chuck 200 that has a pair of outwardly extending flange-like members 220 and 230 extending from an oblong housing 240. The housing 240 is connected to a container 50a having a basewall 52a. The container 50a is preferably substantially identical to the container 50 illustrated in FIG. 4 and as previously discussed for the document carrier 1. The only structural difference between the two containers is that the basewall 52a of container 50a has a set of four openings 53a, 53b, 53c and 53d. Additionally, although not illustrated, but as could be appreciated by those skilled in the art, the height of the side and endwalls, illustrated as 60, 62, and 64 for container 50, could be enlarged to increase the volumetric capacity of the container 50. Lastly, the basewall 52a is preferably fabricated to be stiff engough to prevent deformation of the basewall 52a when the reel 10 is hung in a tape rack. This stiffening can be accomplished through selection of materials and thickness of the basewall 52a. Preferably basewall illustrated 52a could be formed so as to encapsulate a cardboard sheet to enhance its stiffness.

In much of the same manner as the operative elements of the chuck 30, the flange-like members 220 and 240 engage the surface 14 of the tape reel 10, adjacent to the tape hub 18. Additionally the flange-like members further engage the inner surface 18a.

Each of the flange-like members 220 and 230 has a lateral engagement flange, respectively illustrated as 222 and 232, that is configured to bear against and engage the inner surface 18a of the tape hub 18 at opposite locations thereof when the flange-like members 220 and 230 are in their illustrated operative position. The flange-like members 220 and 230 are provided with a pair of top engagement flanges 224 and 234 that are respectively connected to one end of each of the lateral flanges 222 and 232 so that flanges 222 and 232 depend from flanges 224 and 234 and flanges 224 and 234 bear against and engage the surface 14 of the tape reel 10 adjacent to the tape hub 18 at opposite locations of the hub 18. Each of the flange-like members 220 and 230 are also provided with an end bearing flange, illustrated respectively as 226 and 236, spaced from and preferably parallel to the respective lateral engagement flanges 222 and 232. Additionally a pair locating flanges 228 and 238 are respectively connected to one of the ends of each of the end bearing flanges 226 and 236. A pair of bottom connecting flanges 229 and 239 connect the other ends of the lateral engagement flanges 222 and 232 and the other of the ends of the end bearing flanges 226 and 236.

Figure 11:
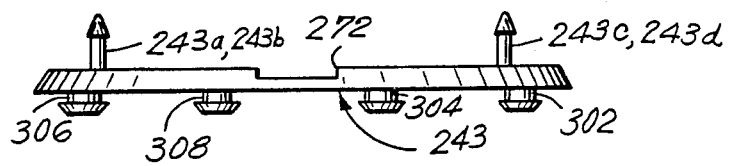
FIG. 11 is a side elevational view of FIG. 10.
Figure 12:
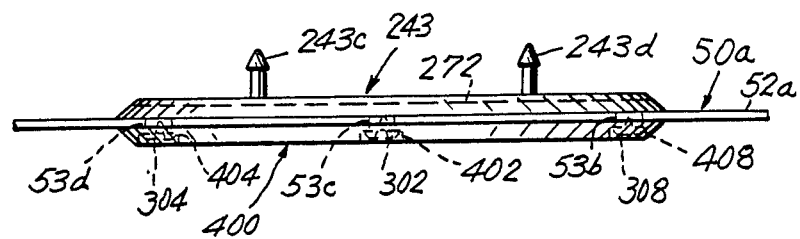
FIG. 12 is a fragmentary elevational view of a stiffening plate, used in the alternative embodiment of the present invention, connected to the basewall of the chuck and the container of such alternative embodiment.

The flange-like members 220 and 230 extend from opposite sides of the central housing 240. The central housing 240 is a six sided polyhedron-like structure that comprises a pair of spaced top and basewalls 241 and 243, a pair of opposed endwalls 242 and 244 and a pair of opposed spaced sidewalls 246 and 248 that connect the endwalls 242 and 244 at opposite ends of the housing The side and endwalls 242 through 248 connect the top and the basewalls 241 and 243 to one another. As illustrated, a set of end bores 242a, 242b, 244a and 244b can be provided at the juncture of the endwalls 242 and 244 with the sidewalls 246 and 248. The side and endwalls 242 through 248 and the top wall 241 can be preferably molded from plastic as a single component. As illustrated, the endwalls 242 and 244 have an arcuate configuration to bear against the inner surface 18a of the tape hub 18 to prevent lateral movement of the tape reel 10. With reference to FIGS. 11 and 12 the basewall 243 can be provided with a set of four upstanding bayonet-like projections 243a, 243b, 243c and 243d that snap into the bores 242a and b and 244a and b to allow assembly of the housing 240 without the use of adhesives and like. Moreover, as illustrated, the basewall 243 preferably has a circular, disc-like configuration and is sized to fit within the tape hub 18 with its outer edges bearing against the surface 18a thereof to further stabilize the chuck 200 when within the hub 18. As such, opposed portions 243e and 243f extend beyond the sidewalls 246 and 248.

With reference to FIG. 9, as will be discussed in greater detail hereinafter, the container 50a is connected to the underside of the housing 240 or to the basewall 243 in much the same manner as the container 50 is connected to the underside of the housing of the chuck 50. The side and end walls 242–248 are sized such that the basewall 243 is within the tape hub 18 and is level with the surface 12 of the tape reel when the flange-like members are engaged to permit the basewall 52a of the container 50a to bear against the surface 12 of the tape reel. As such, outward movement of the tape reel 10, relative to the container 50a is prevented by the the top engagement flanges 242 and 242 bearing against the surface 14 of the tape reel 10. Lateral movement of the tape reel 10, in addition to the oblong housing 240, is further prevented by the lateral engagement flanges 222 and 232 bearing against the surface 18a of the tape hub 18.

With particular reference now to FIG. 8, the housing 240 is provided with a central passageway 250 communicating between the sidewalls 246 and 248. The central passageway comprises a pair mouth-like portions 252 and 254, that are respectively defined in the sidewalls 246 and 248. A central spring channel portion 256 is located between the mouth-like portions 252 and 254 and equidistantly spaced therefrom. A pair of throat-like portions 260 and 262 communicate between opposite ends of the spring channel portion 256 ad the mouth-like portions 252 and 254. The flange-like members 220 and 230 extend into the mouth-like portions 252 and 254 with their locating flanges 228 and 238 within the spring channel portion 256. A biasing spring 270 is located within the spring channel portion and bears against the end bearing flanges 226 and 236 to outwardly bias the flange-like members. As can best be seen in FIG. 9 the locating flanges 228 and 238 extend into the biasing spring 270 at opposite ends thereof. In order to stabilize the movement of the flange-like members 220 and 230, the bottom connecting flanges 229 and 239 ride within a groove 272 of the basewall 243. The groove 272 is aligned with the spring channel portion 256 and is configured to slidably receive the bottom connecting flanges 229 and 239.

A pair of engagement buttons 280 and 290 are provided to inwardly drive the flange-like members 220 and 230 towards one another so that the flange-like members 220 and 230 retract towards the sides of the housing and are manually disengaged from the tape 10. The engagement buttons comprise body portions 282 and 292 that are sized for a close fitting, sliding engagement within the mouth-like portions 252 and 254. The body portions are also provided with bottom grooves 284 and 294 to receive the bottom connecting flanges 229 and 239 of the flange-like members 220 and 230 such that the buttons ride flush against the basewall 243. As illustrated, each of the throat-like portions 260 and 262 has a greater width than the mouth-like and spring channel portions, respectively 252, 254 and 256, to form two pairs of shoulders 260a and 262a at the juncture of the throat-like portions 260 and 262 and each of the mouth-like portions 252 and 254. Each of the body portions 282 and 292 are respectively, preferably provided with a pair of outwardly extending, oppositely directed end flanges 286, 288, and 296, 298 that bear against shoulders 260a and 262a and thereby prevent dislocation of the engagement buttons 280 and 290 from the mouth-like portions 252 and 254. The biasing spring 270 which, as mentioned previously, bears against the end bearing flanges 226 and 236, in turn causes the end bearing flanges 226 and 236 to bear against the body portions 282 and 292 of the respective engagement buttons 280 and 290 in order to also outwardly bias the engagement buttons 280 and 290. In order to disengage the chuck, that is, in order to manually release top engagement flanges 242 and 244 from the inner surface 18a, the buttons 280 and 290 are manually pressed towards one another against the bias of spring 270 to permit the housing 240 to be removed or to be extended into the tape hub 18. In this regard, the engagement buttons can preferably be provided with finger grasping recesses 289 and 299 to aid in the manipulation of the buttons 280 and 290.

With particular reference to FIG. 12 the container 50a is connected to the chuck 200 in much the same manner as the container 50 is connected to the chuck 30. In the case of chuck 200, however, since its intended use is for heavy document carrying applications, preferably a set of four spaced button-like projections 302 through 308 are provided that are integrally formed with and depend from the basewall 243. The button-like projections of chuck 200 preferably have slotted ends for the reasons that have been mentioned previously in connection with the button-like projections of chuck 30. A stiffening plate 400 is provided within the container. Plate 400 has a disc-like configuration of substantially the same thickness and diameter as the preferred basewall 243. Plate 400 has a set of four apertures 402-408 that are configured to align with a set of openings 253a through 253d within the basewall 52a of the container. The button-like projections 302 through 308 are configured to be forced through the openings of the container and the apertures of the stiffening plate 400 to connect the stiffening plate 400 and hence, the basewall 52a of the container 50a, to the underside of the housing 240.

Although the invention has been described with reference to a pair preferred embodiments the invention should not be so considered as so limited, but only as limited as set forth in the appended claims.

I claim:

1. A document carrier for attaching documents to a tape reel having a hub for attaching said tape reel to a sprocket of a tape drive, said document carrier comprising:
   a container to contain said documents having a length greater than the diameter of said hub; and
   a chuck having a housing configured to extend through said tape hub and to engage the inner surface of said tape hub to prevent lateral movement of said tape reel, attachment means for attaching said container to the underside of said housing so that said container is operable to bear against one of the outer surfaces of said tape reel when said housing is extended through said tape hub, and manually releasable engagement means, connected to said housing and spaced from the underside of said housing for releasably engaging the other of the outer surfaces of said tape reel at opposed locations adjacent said tape hub such that said tape reel is operable to be held between said engagement means and said container until said engagement means are manually released, whereupon, said housing may be removed said tape hub and said container may be separated from said tape reel.

2. The tape reel of claim 1 wherein:
   said housing includes,
   a pair of lateral engagement strips spaced apart from one another and configured to bear against the inner surface of said tape hub at diametrically opposite locations thereof,
   a flexible top engagement strip connecting said lateral engagement strips at one end of each of said lateral engagement strips, and
   a base strip connecting said lateral engagement strips at the other end of each of said lateral engagement strips;
   said attachment means are connected to the underside of said base strip; and
   said top engagement strip has a length greater than the diameter of the said tape hub such that the ends of said top engagement strip are operable to engage said other surface of said tape reel adjacent to said tape hub and to form said engagement means, whereby when said top engagement strip is centrally depressed, said ends of said top engagement strip deform away from the said other surface of said tape reel to thereby allow for the removal of said housing from said tape hub.

3. The document carrier of claim 2 wherein:
   said container has a basewall configured to lie flush against the said one surface of said tape reel
   said basewall has a pair of openings;
   said attachment means includes,
   a pair of downwardly depending button-like projections attached to said base strip and configured to be forced through said openings of said basewall, and
   a stiffening plate located within said container, said stiffening plate having a pair of apertures aligned with said openings so that said one button-like projection may also be forced through said apertures of said stiffening plate and, hence, said basewall is attached to said base strip by said button-like projections.

4. The document carrier of claim 3 wherein said container includes:
   a top wall spaced from said basewall;
   a set of interconnected side and endwalls connecting said top wall and to said basewall;
   said basewall having at one end, an extending coverflap portion that is operable for rotational movement with respect to said basewall so as to be brought in and out of contact with said top wall when rotated; and
   means for releasably connecting said coverflap portion to said top wall to seal said container.

5. The document carrier of claim 1 wherein:
   said housing has an oblong configuration, a pair of arcuate ends configured to engage said inner surface of said tape hub to prevent lateral movement of said tape reel and a central passageway communicating between the opposite sides of said housing; and
   said engagement means include,
   a pair of flange-like members located within and extending from said central passageway in opposite directions said flange-like members configured to engage said other surface of said tape reel adjacent to said tape hub and, further, to bear against said inner surface of said tape hub when in an operative position, a pair of engagement buttons spaced apart from one another, located within said central passageway, overlying said flange-like members and projecting from said central passageway so that engagement buttons are manually accessible from the opposite ends of said passageway, said flange-like members having means for connecting said flange-like members to said engagement buttons so that when said engagement buttons are inwardly depressed, said flange-like members retract towards said sides of said housing from their said operative position and disengage from said other surface of said tape reel and said inner surface of said tape hub such that said housing may be removed from said tape hub, and a biasing spring, located within said central passageway, bearing against said flange-like member connection means to outwardly bias said flange-like members and said engagement buttons such that said flange-like members are biased to assume their said operative position.

6. The document carrier of claim 5 wherein:
said central housing includes,
a pair of opposed, spaced top and basewalls,
a pair of opposed, spaced endwalls having an arcuate configuration to bear against said inner surface of said tape hub,
a pair of sidewalls connecting the opposite ends of said endwalls, the said side and endwalls connecting said top and basewalls to one another to form a six sided polyhedron-like structure;
said central passageway communicates between said sidewalls; and
said attachment means are connected to said basewall.

7. The document carrier of claim 6 wherein each of said flange-like members includes:
a top engagement flange, oriented and configured to engage said other surface of said tape reel adjacent to said tape hub;
a lateral engagement flange, connected, at one end, to and depending from, said top engagement flange, said lateral engagement flange configured to engage said inner surface of said tape hub;
a bottom connecting flange, connected, at one end, to the other end of said lateral engagement flange, said bottom connecting flange extending into central passageway beneath said engagement buttons; and
said connection means of each of said flange-like members including,
an end bearing flange oriented parallel to said lateral engagement flange and connected, at one end, to the other end of said bottom connecting flange to bear against a said engagement button, and
a locating flange, connected, at one end, to the other end of said end bearing flange so as to extend into said biasing spring so that said biasing spring bears against said end bearing flanges of each of said flange-like members and said end bearing flanges of each of said flange-like members bear against said engagement buttons.

8. The document carrier of claim 7 wherein said basewall has a circular disc-like configuration so that the outer edges of said basewall bear against said inner surface of said tape hub when said housing is extended therein.

9. The document carrier of claim 8 wherein:
said central passageway has,
a pair of mouth-like portions defined in said sidewalls,
a centrally located spring receiving portion, equidistantly spaced between said mouth-like portions, and
a pair of throat-like portions communicating between said mouth-like portions and the opposite ends of said spring receiving portion, said throat-like portions sized larger than said mouth-like and said spring receiving portions to form a pair of shoulders at each of the junctures of said throat-like portions and said mouth-like portions,
said biasing spring is located within said spring receiving portion; and
each of said engagement buttons comprises a body portion configured for sliding movement within said mouth-like portions and a pair of spaced, oppositely directed, stop flanges connected to opposite sides of said body portion and configured to engage said shoulders formed by the juncture of said mouth-like and said throat-like portions to prevent dislocation of said buttons from said housing.

10. The document carrier of claim 9 wherein:
said base wall has a central channel configured to slidably receive said bottom connecting flanges; and
each of said engagement buttons includes a bottom groove, defined in the underside of said body portion, configured to receive said bottom connecting flanges so that the underside of said engagement buttons lies flush against said bottom wall.

11. The document carrier of claim 10 wherein:
said container has a basewall configured to lie flush against the said one surface of said tape reel and said basewall has a set of four openings;
said attachment means includes,
a set of four downwardly depending button-like projections attached to said basewall and configured to be forced through said openings of said basewall, and
a stiffening plate located within said container, said stiffening plate having a set of four apertures aligned with said openings so that said one button-like projections may also be forced through said apertures of said stiffening plate, and, hence, said basewall of said container is attached to said basewall of said container by said button-like projections.

* * * * *